March 8, 1966 F. F. VAN RADEN 3,239,238
ELEVATABLE GOOSENECK
Filed Dec. 21, 1962 5 Sheets-Sheet 1
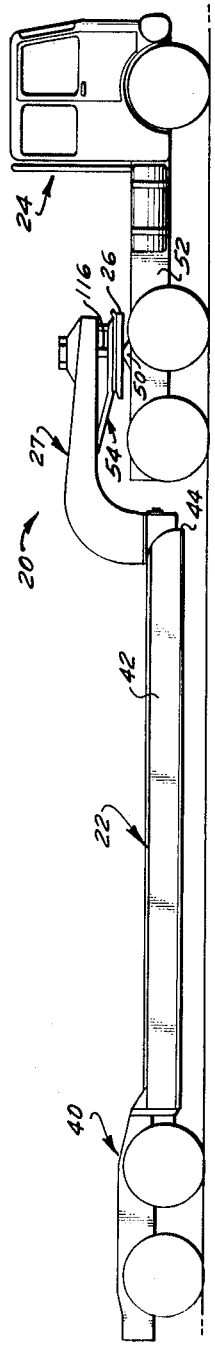
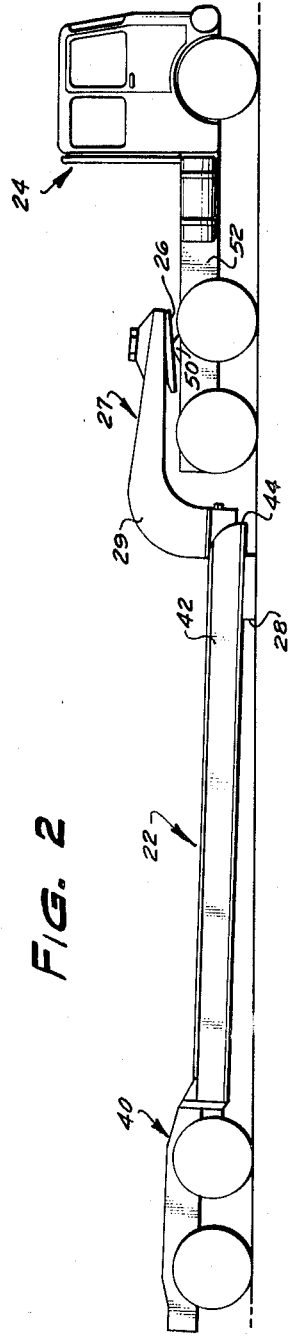
FREDERICK F. VAN RADEN,
INVENTOR.
BY
BUCKHORN, BLORE, KLARQUIST & SPARKMAN
ATTORNEYS March 8, 1966  F. F. VAN RADEN  3,239,238
ELEVATABLE GOOSENECK
Filed Dec. 21, 1962  5 Sheets-Sheet 2

FREDERICK F. VAN RADEN,
INVENTOR.
BY
BUCKHORN, BLORE, KLARQUIST & SPARKMAN
ATTORNEYS

March 8, 1966 F. F. VAN RADEN 3,239,238
ELEVATABLE GOOSENECK
Filed Dec. 21, 1962 5 Sheets-Sheet 3
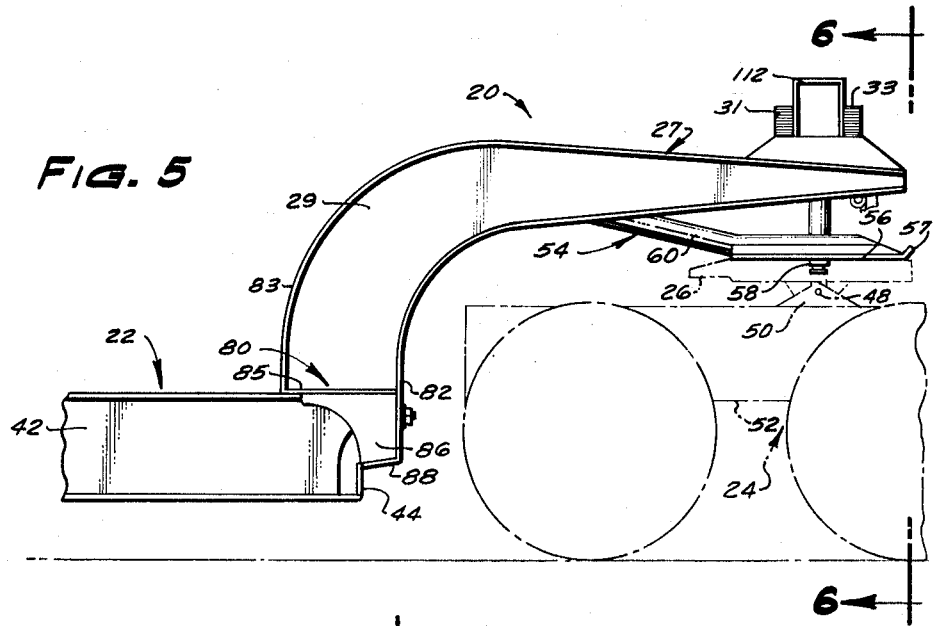
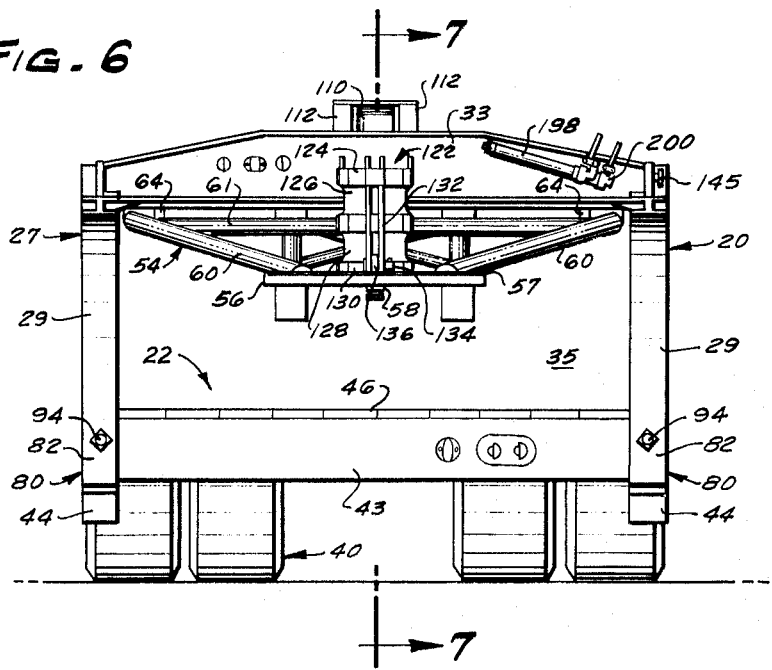
FREDERICK F. VAN RADEN,
INVENTOR.
BY
BUCKHORN, BLORE, KLARQUIST & SPARKMAN
ATTORNEYS

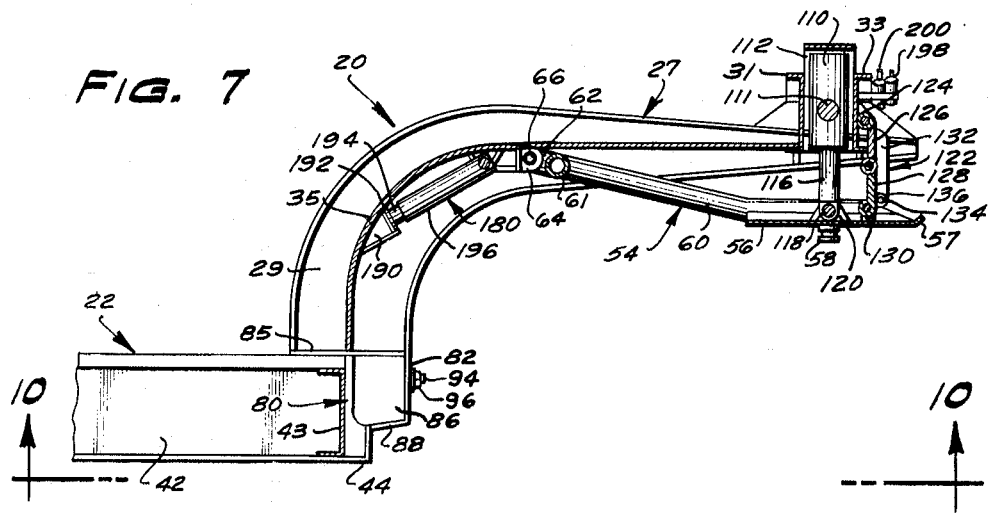
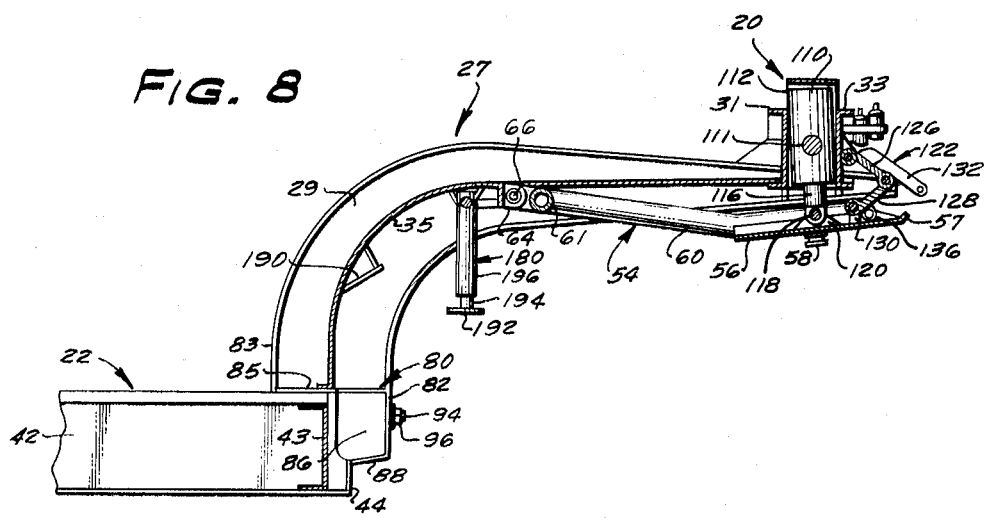
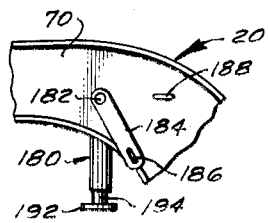

March 8, 1966 F. F. VAN RADEN 3,239,238
ELEVATABLE GOOSENECK
Filed Dec. 21, 1962 5 Sheets-Sheet 5
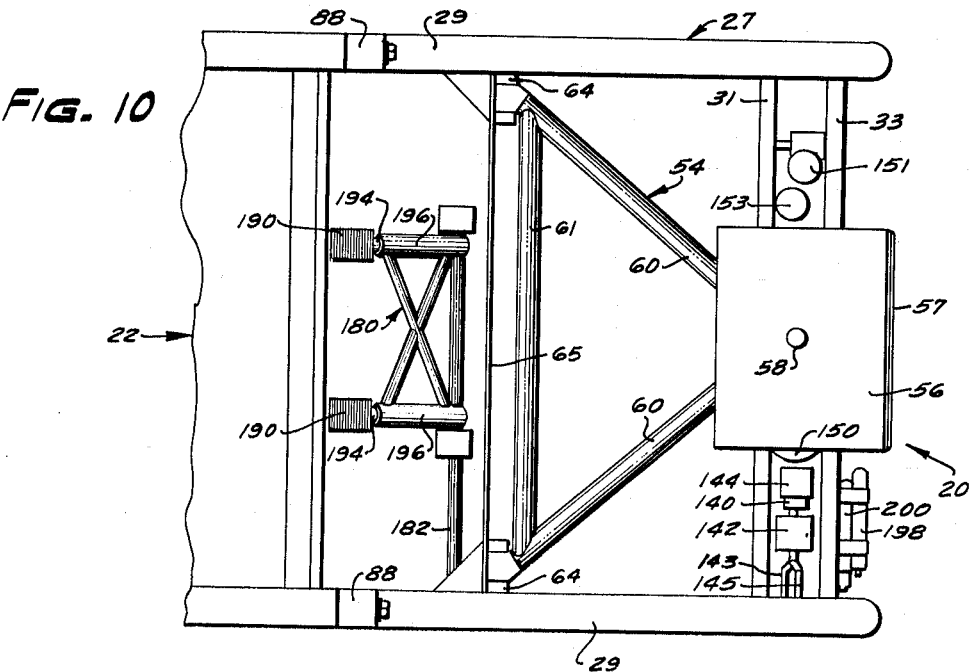
FIG. 10
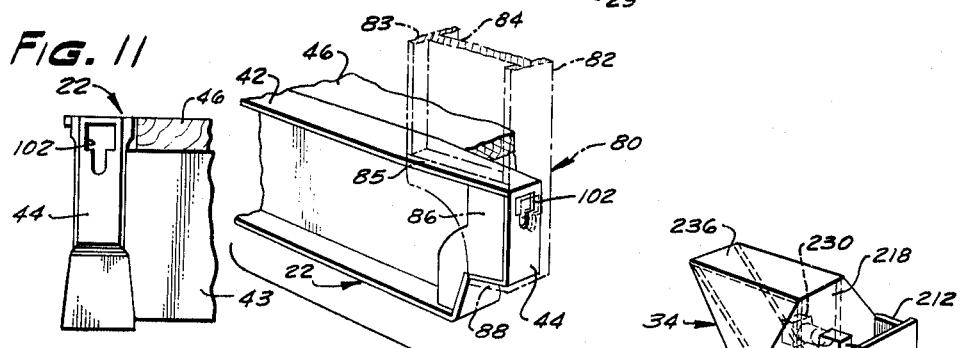
FIG. 11
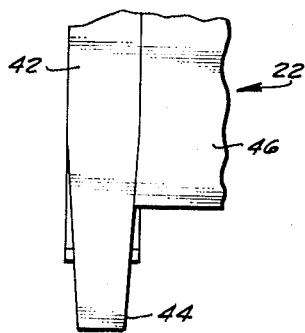
FIG. 12
FIG. 13
FREDERICK F. VAN RADEN,
INVENTOR.
BY
BUCKHORN, BLORE, KLARQUIST & SPARKMAN
ATTORNEYS United States Patent Office 3,239,238
Patented Mar. 8, 1966

1

3,239,238
ELEVATABLE GOOSENECK
Frederick F. Van Raden, Portland, Oreg., assignor to Peerless Trailer & Truck Service, Inc., Portland, Oreg., a corporation of Oregon
Filed Dec. 21, 1962, Ser. No. 246,472
10 Claims. (Cl. 280—425)

This invention relates to a gooseneck for trailers, and more particularly to an elevatable gooseneck for attaching a trailer to a tractor.

An object of the invention is to provide a gooseneck which may be easily attached to and detached from a flatbed trailer and a truck-tractor.

Another object of the invention is to provide a gooseneck adapted to raise and lower a flatbed trailer end and detachable from the trailer for loading and unloading the trailer.

A further object of the invention is to provide a gooseneck which may be hydraulically raised and lowered and which can be locked in its raised position.

A further object of the invention is to provide a gooseneck having elevating means positioned directly over a fifth wheel of a truck-tractor.

A still further object of the invention is to provide a gooseneck which may be tilted relative to the longitudinal axis of a trailer to facilitate attachment of the gooseneck to the trailer and detachment of the gooseneck from the trailer.

In accordance with an illustrated embodiment, the gooseneck of the invention includes a gooseneck frame attachable at one end to the front end of a flatbed trailer and at the other end thereof to a truck-tractor together with elevating means for raising and lowering the gooseneck frame relative to the truck-tractor. The gooseneck is provided with a traction frame pivotally connected to the gooseneck frame and connected to the fifth wheel of the truck-tractor. An expansible hydraulic unit is connected at one end to the portion of the traction frame over the fifth wheel and at the other end is connected pivotally to the gooseneck frame. There is also provided a jack frame carrying two leg-like hydraulic jacks which may be pivoted from a folded position relative to the gooseneck frame to an operative position in which the legs individually engage the tractor frame and which may be individually operated to tilt the gooseneck frame to align the same with the trailer. A cap may be provided for attachment to the trailer frame for supporting one end of a loading plank and connecting that end to the trailer.

A complete understanding of the invention may be obtained from the following detailed description of a gooseneck forming a specific embodiment thereof, when read in conjunction with the appended drawings, in which:

FIG. 1 is a side elevation view of a gooseneck forming one embodiment of the invention and connecting a flatbed trailer and a truck-tractor in operative or travel positions;

FIG. 2 is a view similar to FIG. 1 but with the trailer lowered at its front end and blocked preparatory to detachment of the gooseneck therefrom;

FIG. 5 is an enlarged, fragmentary, side elevation view of the gooseneck of FIG. 1 connecting the truck-tractor and the trailer;

FIG. 6 is an enlarged front elevation view of the gooseneck and the trailer taken substantially along line 6—6 of FIG. 5;

2

Figure 14:
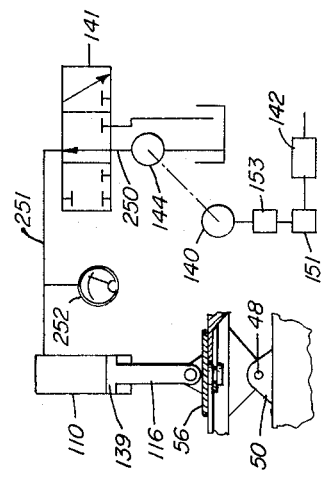

FIG. 7 is a fragmentary, sectional view taken along line 7—7 of FIG. 6;

FIG. 8 is a view similar to FIG. 7 but with parts thereof in different positions;

FIG. 9 is an enlarged, fragmentary, elevational view of a portion of the gooseneck of FIG. 1;

FIG. 10 is a fragmentary, bottom plan view taken along line 10—10 of FIG. 7;

FIG. 11 is an enlarged, fragmentary, front elevation view of the trailer shown in FIG. 1;

FIG. 12 is an enlarged, fragmentary, top plan view of the portion of the trailer shown in FIG. 11;

FIG. 13 is an enlarged, fragmentary, exploded view of a portion of the trailer and the connector cap for connecting the loading planks to the trailer; and FIG. 14 is a schematic view of a fluid pressure system of the gooseneck of FIG. 1.

Figure 3:
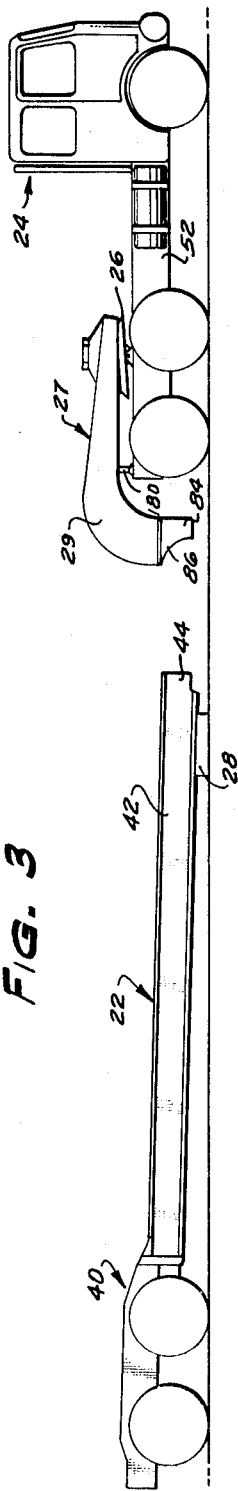
FIG. 3 is a view similar to FIG. 2 but with the gooseneck detached from the trailer.
Figure 4:
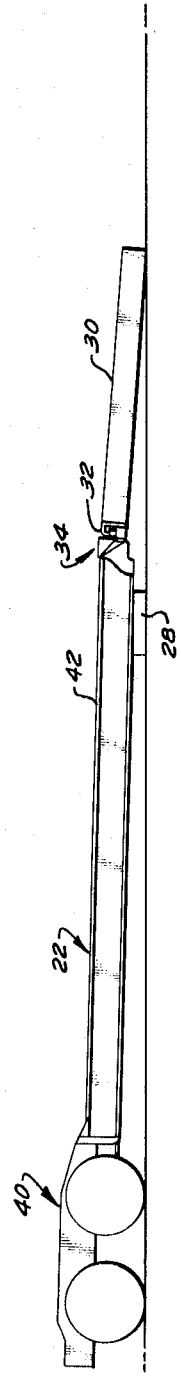
FIG. 4 is a view similar to FIG. 3 with loading planks and connector caps fastened to the trailer for loading and unloading the trailer.

Referring now in detail to the drawings, there is shown therein an elevatable gooseneck 20 adapted to be rigidly but releasably attached to the forward end of a flatbed truck-trailer 22 for connecting the trailer to a truck-tractor 24, through a fifth wheel 26 of the tractor 24. The gooseneck 20 has a main frame 27 which may be raised and lowered selectively, by means to be described, to raise the front end of the trailer 22 to an operative or travel position as illustrated in FIG. 1, and to lower the front end of the trailer 22 to a loading and unloading position, as illustrated in FIGS. 2 to 4. Blocks 28 support the forward end of the trailer 22 when it is in its lowered or loading and unloading position, in which latter position loading planks 30 having connecting hooks 32 may be connected to the trailer by detachable connector caps or adapters 34. The trailer 22 is provided with a rear wheel assembly 40 to which the flatbed or frame thereof is attached for pivotal movement of the frame between the operating or travel position thereof shown in FIG. 1 and the loading and unloading position thereof shown in FIGS. 2, 3 and 4.

The construction of the trailer is old and well known and will be described only in sufficient detail to relate the trailer to the gooseneck 20 and the connector caps 34. Referring to FIGS. 7 and 8, the frame of the trailer includes longitudinal side frame members 42 connected by cross-beams illustrated by a front cross-beam 43. The frame members 42 have tapered and slotted end connector portions 44 (FIG. 13) for attachment to the gooseneck and also for attachment to the connector caps 34. A bed 46 is provided on the trailer.

The gooseneck 20 is attachable to and detachable from the fifth wheel 26 of the tractor 24. The fifth wheel 26 is pivotal on a horizontal pivot pin 48 (FIG. 5) carried by a clevislike member 50 fixed to frame 52 of the tractor, as is well known in the art. The fifth wheel 26 is free to tilt within limits relative to the truck bed or frame about the pivot pin 48 which extends transversely relative to the tractor 24.

The gooseneck main frame 27 comprises a pair of fabricated I-beams 29 which curve upwardly and forwardly from the trailer 22 and which are connected by girder-like channels or beams 31 and 33 at their forward ends and by a plate 35 extending from the beam 31 to a point near the lower ends of the beams 29. Pivotally mounted on the main frame 27 is a traction frame 54 having a fifth wheel plate 56 provided with an inclined nose portion 57 to facilitate sliding the plate 56 onto the fifth wheel 26 during assembly. The plate 56 carries a kingpin 58 for connecting the plate 56 to the fifth wheel 26 and permitting pivotal movement of the gooseneck about the longitudinal axis of the kingpin 58 relative to the fifth wheel 26. The fifth wheel plate 56 is rigidly connected to a trusslike generally triangular frame comprising a pair of tubular rods 60 journaled on pintles 66 carried by hinge brackets 64 mounted on the beams 29. A truss rod 61 extends between the rods 60 adjacent the brackets 64.

Referring to FIGS. 7, 8 and 13, the lower ends of the I-beams 29 are formed with sockets 80 to receive the connector portions 44 of the trailer. As best shown in FIG. 13, the back flange 82 of beam 29 extends below the end of the opposite flange 83 and the web 84. Welded to the end of the web and to such flanges is a plate 85 forming the top wall of the socket. Plates 86 defining the sidewalls of the socket are in turn welded to the plates 85 and the edges of the flange 82. The bottom wall of the socket is defined by a plate 88 welded to the side plates 86 and bottom edge of the flange 82. Th socket thus defined is open toward the rear of the gooseneck and is designd to receive a connector portion 44 of the trailer. The sliding friction between the connector portions 44 and the socket plates 86 is ordinarily sufficient to prevent separation of the gooseneck from the trailer when the trailer is supported on the gooseneck. However, a positive attachment is provided. As best shown in FIGS. 11 and 13 the end plate of the trailer connecting portions 44 and the end walls of the sockets are both provided with slots 102 having enlarged square openings at the upper portion, the lower portion being of lesser width. To secure the trailer to the gooseneck, square headed bolts 94 are inserted, head end in, through the aligned square openings and the shanks positioned in the narrower bottom portions of the openings. Thereafter lock nuts 96 are tightened down against the flanges 82. When the gooseneck is to be removed the nuts 96 are unscrewed and the bolts removed.

To raise and lower the fifth wheel plate 56 relative to the gooseneck, a hydraulic cylinder 110 is provided. The cylinder 110 is pivotally mounted on pins 111 between channels 112 extending transversely between the girders 31 and 33. The piston rod 116 of the cylinder 110 is pivotally connected at its lower end by a pin 118 (FIG. 7) to a clevislike hinge bracket 120 rigidly secured to the plate 56 in a position generally aligning the piston rod 116 with the kingpin 58. As shown in FIGS. 1 and 2, raising and lowering of the gooseneck 20 effects raising and lowering of the forward end of the trailer 22. During the travel of the trailer 22, the main frame 27 of the gooseneck 20 is carried in its raised position in which the piston rod 116 is extended relative to the cylinder 110, as illustrated in FIGS. 1 and 7. When in the traveling or operating position, the forward end of the main gooseneck frame 27 is held rigidly relative to the traction frame 54 by means of a collapsible strut 122 (FIGS. 7 and 8) which includes a link 126 pivotally connected to a bracket 124 fixed to the channel 33 and also pivotally connected to a link 128 which is in turn pivotally connected to a bracket 130 rigidly fixed to the fifth wheel plate 56. To lock the strut 122 in its extended or uncollapsed position, in which the pivot axes of the links 126, 128 are in lateral alignment, there is provided a fork member 132 rigidly fixed to the link 126 and extending therebeyond. The fork 132 brackets a locking lug 136 on the link 128 having a hole therethrough for receiving a locking pin 134. The pin 134 may be removed from the fork 132 and the locking lug 136 to release the strut for collapsing.

Comparison of FIGS. 7 and 8 will show the relative movements of the cylinder, strut and fifth wheel plate during raising and lowering of the gooseneck. FIG. 8 does not show the correct position of the trailer and gooseneck in the lowered condition since in such condition the trailer and gooseneck would actually be inclined to the horizontal.

Piston 139 (FIG. 14) in the hydraulic cylinder 110 is driven by hydraulic liquid supplied thereto by a pump 144 which is driven by a pneumatic motor 140. The motor is driven by air under pressure supplied by the truck-tractor 24, and manual control rods 143 and 145 extend to the side of the gooseneck to control the operation of the motor 140 and cylinder 110 through suitable valves 141 and 142. The pump 144, motor 140, a reservoir 150, an air filter 151 and an air lubricator 153 are all mounted between the channels 31 and 33.

To support the weight of the rear portion of the gooseneck frame 27 during attachment of the gooseneck frame 27 to the trailer 22 and detachment therefrom, a jack frame or support 180 (FIG. 10) is carried rigidly on a shaft 182 and may be swung between a folded or retracted position as shown in FIGS. 7 and 10 and an operable position as shown in FIGS. 3 and 8 by means of a handle 184 (FIG. 9) keyed to the shaft 182 and operable by the operator, the handle 184 being provided with a slot 186 adapted to go over a latching lug 188 normally to hold the jack frame 180 in its retracted position. The lug 188 is provided on one of the frame beams 29. Retaining sockets or hooks 190 (FIG. 7) are secured to the plate 35 for receiving feet 192 connected to piston rods 194 extending into cylinders 196 forming the side members of the frame 180. To detach the trailer 22 from the gooseneck 20 after the trailer has been lowered, the fram 180 is swung down to its operating position and manually operable hydraulic pumps 198 and 200, each being connected to one of the cylinders 196 for individually extending the piston rods 194, are operated to move the feet 192 into engagement with the truck frame 52. This causes the gooseneck 20 to be supported completely by the tractor 24. The nuts 96 then are loosened on the bolts 94 and the bolts removed whereafter the truck-tractor may be driven away from the trailer to disconnect the socket portions 80 from the end connector portions 44 of the longitudinal side frame members 42 of the trailer 22. The piston rods 194 are individually extensible from the cylinders 196 to tilt the main gooseneck frame 27 about the longitudinal axis thereof whenever this is necessary to align the socket portions 80 with the end connector portions 44, the fifth wheel 26 being permitted to tilt slightly relative to the frame 52 about the longitudinal axis of the tractor 24 by slightly loose connections between the members 48 and 26.

Each ramp supporting end cap 34 (FIGS. 4 and 13) is formed of a rigid shell 210 having rigid arms 212 carrying a bar 214 to form, in effect, an eye. A member 216 is rigidly fastened to forward wall 218 of the shell 210 and to the central portion of the bar 214. Rigid, generally triangular plates 220 are fixed in parallel positions in the shell 210 and fit over the sides of the end connector portions 44 of the side frame members 42. Fixed rigidly to the front plate 218 is a headed bolt 230 designed to fit into the slots 102 to lock the end caps 34 to the members 42. The shell 210 also has a top plate portion 236 formed integrally therewith. The bar 214 is adapted to receive the hooks 32 (FIG. 4) secured to the ends of the planks 30. The caps 34 and hooks 32 prevent the planks 30 from moving longitudinally relative to the bed of the trailer 22 during loading or unloading of the heavy equipment.

In removing the trailer 22 from the gooseneck 20, the tractor 24 and the trailer are lined up in a straight line and the locking pin 134 of the collapsible strut 122 is removed therefrom. Then pressure to the cylinder 110 is released and the trailer and main gooseneck frame 27 move by gravity until the trailer frame members 42 engage the blocks 28 (FIG. 2). The nuts 96 (FIG. 7) then are loosened, and the tractor and gooseneck are moved forward slightly. The jack frame 180 (FIG. 7) then is swung down over the tractor frame 52 and the pumps 198 and 200 are operated manually to raise the main gooseneck frame 27 somewhat relative to the trailer. The nuts 96 and bolts 94 then are removed and the tractor with the gooseneck moved away from the trailer. Thereafter the trailer may be loaded or unloaded utilizing the ramp supporting end caps 34 and planks 30.

To reconnect the gooseneck 20 to the trailer 22, the truck-tractor with the gooseneck is backed onto the trailer to move the socket portions 80 of the gooseneck over the end connector portions 44. If necessary, the jacks 196 are operated to align the sockets with the connectors 44 since the trailer may tilt during loading or unloading. The bolts 94 and nuts 96 are reassembled (FIG. 11), and the nuts 96 tightened to pull up the gooseneck socket portions 80 onto the trailer connector portions 44. The jack frame 180 then is released and moved to its folded position, and the hydraulic cylinder 110 is actuated to lift the main gooseneck frame 27 and the trailer until the strut 122 is fully extended.

To raise the gooseneck 20 relative to the tractor 24, the operator actuates valves 141 and 142 (FIG. 14) to operate the motor 140 and connect the upper end of the cylinder 110 to the pump 144, respectively. The motor then drives the pump 144 to supply the hydraulic liquid under pressure through conduits 250 and 251 to the upper end of the cylinder 110 to push the cylinder 110 upwardly relative to the piston 139 to raise the gooseneck with respect to the truck-tractor to the desired height. The operator then actuates the valves 141 and 142 to close off the conduit 251 to maintain the cylinder 110 elevated. The locking pin 134 then is inserted to latch the strut 122 in its extended position and the entire assembly is ready for travel.

An advantage of the substantial axial alignment of the cylinder 110 with the kingpin 58 is that the pressure on the hydraulic liquid in the cylinder 110 is proportional to the vertical load or weight applied to the tractor. To measure this load, a pressure gauge 252 is operatively connected to the interior of the conduit 251, and is actuated by the pressure on the hydraulic liquid in the upper end of the cylinder 110. The pressure gauge is calibrated in terms of weight applied by the gooseneck to the fifth wheel. Thus, the gooseneck acts as a scale to give load weight. Since the piston 139 and cylinder 110 are directly over the centerline of the pin 148 and extend substantially vertically, calibration of the gauge 252 is simple and uncomplicated. For accuracy in such weighing, the locking pin 134 (FIGS. 7 and 8) is temporarily removed from the collapsible strut 122, and the cylinder 110 is moved, if necessary, to a position in which there is no tension on the strut 122.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a trailer truck,
a tractor having a fifth wheel,
a trailer including a rear wheel assembly and an elongated frame pivotally supported on the rear wheel assembly,
a gooseneck member having a lower and an upper end,
releasable means for rigidly connecting the lower end of the gooseneck member to the front of the frame of the trailer,
traction means connected to and extending between said fifth wheel and said gooseneck member for transmitting tractional force from said fifth wheel to said gooseneck member, and
means for raising and lowering the upper end of the gooseneck member relative to said fifth wheel between a lower position in which the upper end of said gooseneck member is adjacent the fifth wheel and the front end of the trailer frame is positioned near the ground and a travel position in which the upper end of the gooseneck member is raised above the fifth wheel and the front end of the trailer frame is raised substantially above the lower position thereof.

2. In a trailer truck,
a tractor having a fifth wheel,
a trailer including a rear wheel assembly and an elongated frame pivotally supported on the rear wheel assembly,
a gooseneck member having a lowerd and an upper end,
releasable means rigidly connecting the gooseneck member to the front end of the frame of the trailer,
traction means for transmitting tractional force from said fifth wheel to said gooseneck member connected at one end to the fifth wheel for pivotal movement relative to the fifth wheel about a substantially vertical axis and connected to the gooseneck member for pivotal movement relative to the gooseneck member about a substantially horizontal axis, and
means for raising and lowering the upper end of the gooseneck member relative to said fifth wheel between a lower position in which the front end of the trailer frame is positioned near the ground and a travel position in which the front end of the trailer frame is raised substantially above the lower position thereof.

3. In a trailer truck,
a tractor having a fifth wheel,
a trailer including a rear wheel assembly and an elongated frame pivotally supported on the rear wheel assembly,
a gooseneck member having a lower and an upper end,
means rigidly and detachably connecting the said lower end of said gooseneck member to the front end of the trailer frame,
traction means connected to the fifth wheel for pivotal movement relative thereto about a substantially vertical axis, and
hydraulic means connecting the upper end of the gooseneck member to the traction means for movement of the gooseneck member between a lower position in which the front end of the trailer frame is positioned near the ground and a travel position in which the front end of the trailer frame is raised substantially above the lower position thereof.

4. In a trailer truck,
a tractor having a fifth wheel pivotal on a horizontal axis,
a trailer including a rear wheel assembly and an elongated generally rectangular trailer frame pivotally supported on the rear wheel assembly and having a pair of connector portions at the forward corner portions thereof,
a gooseneck member having a lower portion provided with a pair of connector portions spaced apart and adapted to engage the connector portions of the trailer frame and also having a generally horizontal upper portion,
releasable means for connecting the connector portions of the gooseneck member to the connector portions of the trailer frame to form the gooseneck member and the trailer frame into a rigid assembly,
a rigid traction frame having a rear portion and also including a forward portion,
means connecting the forward portion of the traction frame to the fifth wheel for pivotal movement on a vertical axis,
means connecting the rear portion of the traction means pivotally to the rear portion of the upper portion of the gooseneck member at laterally spaced points for pivotal movement therebetween about a horizontal axis,
an expansible hydraulic unit including a cylinder and a piston member,
means connecting one end of the hydraulic unit pivotally to the forward portion of the traction frame, and means connecting the other end of the hydraulic unit pivotally to the forward end of the upper portion of the gooseneck member so that said forward end of said gooseneck member may be raised and lowered relative to said traction frame forward portion.

5. In a trailer truck, a tractor, a fifth wheel member connected to the tractor pivotally on a horizontal transverse axis relative to the tractor, a traction frame having means pivotally connecting one end of the traction frame to the fifth wheel member, a gooseneck member, means pivotally connecting the other end of the traction frame to a point on the gooseneck spaced substantially behind the forward end of the upper portion of the gooseneck member, expansible hydraulic means connected pivotally at one end to the forward end of the upper portion of the gooseneck member and connected pivotally at the other end thereof to the forward end of the traction frame for raising and lowering the gooseneck, a strut, and means for releasably connecting the strut between the forward end of the upper portion of the gooseneck and to the forward end of the traction frame in a position substantially parallel to the extensible hydraulic means when the extensible hydraulic means holds the gooseneck member in an elevated position positively to secure said gooseneck member in said elevated position.

6. In a trailer truck, a tractor, a fifth wheel member connected to the tractor pivotally on a horizontal transverse axis relative to the tractor, a traction frame having means pivotally connecting one end of the traction frame to the fifth wheel member, a gooseneck member, means pivotally connecting the other end of the traction frame to a point on the gooseneck spaced substantially behind the forward end of the upper portion of the gooseneck member, expansible hydraulic means connected pivotally at one end to the forward end of the upper portion of the gooseneck member and connected pivotally at the other end thereof to the forward end of the traction frame for raising and lowering the gooseneck, a collapsible strut movable between a collapsed condition and an extended condition, means connecting one end of the strut to the forward end of the gooseneck member, means connecting the other end of the strut to the forward end of the traction frame, and releasable means for locking the strut in extended condition.

7. In a trailer truck, a tractor, a fifth wheel member mounted pivotally on the tractor for pivotal movement on a horizontal axis transverse relative to the tractor, a traction frame having kingpin means pivotally connecting one end of the traction frame to the fifth wheel member, a gooseneck member, means pivotally connecting the other end of the traction frame to a point on the gooseneck member spaced substantially behind the forward end of the upper portion of the gooseneck member, a trailer having an elongated frame, releasable means connecting the lower end of the gooseneck member rigidly to the forward end of the trailer frame, expansible hydraulic means connected pivotally at one end to the forward end of the upper portion of the gooseneck member and pivotally at the other end of the forward end of the traction frame substantially directly in alignment with the kingpin means for raising and lowering the gooseneck member, a collapsible strut connecting the forward end of the upper portion of the gooseneck member to the forward end of the traction frame and adatped to assume a parallel position relative to the extensible hydraulic means when the extensible hydraulic means holds the gooseneck member in an elevated position, and means for locking the collapsible strut in an extended condition.

8. In a trailer truck, a trailer including rear wheels and a frame connected pivotally at the rear end portion thereof to the trailer wheels, a rigid gooseneck member, a pair of laterally spaced coupling means on the gooseneck member and the front end of the frame for detachably connecting the lower end of the gooseneck member and the forward end of the frame rigidly together at points positioned at the extreme lateral extremities of the gooseneck member and the frame, a tractor, a fifth wheel mounted on the tractor, elevating means connecting the upper forward portion of the gooseneck member to the fifth wheel, traction means pivotally mounted on the fifth wheel and connecting the fifth wheel to the gooseneck member, and a pair of individually operable jack means pivotally mounted on the gooseneck member at points on opposite sides of the longitudinal centerline of the gooseneck member and movable between retracted positions extending along the gooseneck member and operative positions in which each of the jack means engages the tractor and whereby the jack means may be operated individually when in operative positions to twist the gooseneck member to align the laterally spaced coupling means on the trailer and the gooseneck member for attachment therebetween when the trailer frame is tilted about the longitudinal axis thereof relative to the tractor to facilitate coupling the tractor to the gooseneck member.

9. In a gooseneck for a trailer truck, a gooseneck assembly including a pair of parallel L-shaped longitudinal girders having upper portions and depending portions, a pair of parallel transverse top girders rigidly connecting the forward portions of the upper portions of the longitudinal girders, and a panel connecting the longitudinal girders, coupling means on the lower ends of the depending portions of the longitudinal girders, a traction frame having a forward plate portion and a kingpin extending downwardly from the forward plate portion and also including a rear portion having aligned hinge members, means hinging the hinge members to the rear portions of the upper portions of the longitudinal girders, a hydraulic cylinder, means pivotally connecting the hydraulic cylinder to the gooseneck assembly between the parallel transverse girders to a downwardly extending position, a piston member slidable in the cylinder and having a rod extending downwardly from the lower end of the cylinder, and means pivotally connecting the lower end of the rod to the forward plate portion of the traction frame at a point thereon substantially directly above the kingpin.

10. The gooseneck of claim 9 and including
a first strut link pivotally connected at one end thereof to one of the parallel top girders,
a second strut link pivotally connected at one end thereof to the forward plate portion of the traction frame and pivotally connected at the other end thereof to the first strut link,
lug means fixed to the forward plate portion,
the first strut means having a forked portion adapted to bracket the lug means, and
pin means for releasably locking the forward portion to the lug means.

References Cited by the Examiner
UNITED STATES PATENTS

| | | | |
|---|---|---|---|
| 2,646,272 | 7/1953 | Swift | 177—141 |
| 2,667,363 | 1/1954 | Talbert | 280—425 |
| 2,705,081 | 3/1955 | Jacobs | 214—85 |
| 2,788,145 | 4/1957 | Clark | 280—425 X |
| 2,844,265 | 7/1958 | Clark | 214—506 |
| 2,851,171 | 9/1958 | Martin | 214—2 |
| 2,854,252 | 9/1958 | McLerran | 280—425 |
| 2,872,059 | 2/1959 | Miller | 214—506 |
| 2,966,274 | 12/1960 | Price | 214—85 |
| 3,154,160 | 10/1964 | Rockwell | 177—141 |

A. HARRY LEVY, *Primary Examiner*

GERALD M. FORLENZA, LEO FRIAGLIA,
*Examiners.*